US006758087B2

(12) United States Patent
Balch et al.

(10) Patent No.: US 6,758,087 B2
(45) Date of Patent: Jul. 6, 2004

(54) METHOD, SYSTEM AND STORAGE MEDIUM FOR DETERMINING A VEHICLE REFERENCE SPEED

(75) Inventors: Edgar T. Balch, Erie, PA (US); Ajith Kuttanair Kumar, Erie, PA (US); Bret Dwayne Worden, Union City, PA (US)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 09/842,554

(22) Filed: Apr. 26, 2001

(65) Prior Publication Data

US 2001/0035049 A1 Nov. 1, 2001

Related U.S. Application Data

(60) Provisional application No. 60/200,412, filed on Apr. 28, 2000.

(51) Int. Cl.[7] .............................................. B61C 15/08
(52) U.S. Cl. ........................ 73/118.1; 73/488; 180/197
(58) Field of Search .......................... 73/488, 489, 495, 73/510, 118.1; 290/45; 303/151, 178; 324/160, 161; 701/19, 20, 69

(56) References Cited

U.S. PATENT DOCUMENTS

| | | | | |
|---|---|---|---|---|
| 4,896,090 A | * | 1/1990 | Balch et al. | 318/52 |
| 5,629,567 A | | 5/1997 | Kumar | |
| 6,028,402 A | | 2/2000 | Kumar et al. | |
| 6,152,546 A | * | 11/2000 | Daigle | 303/151 |
| 6,194,850 B1 | * | 2/2001 | Kumar et al. | 318/52 |
| 6,208,097 B1 | * | 3/2001 | Reddy et al. | 318/52 |
| 6,499,815 B1 | * | 12/2002 | Daigle | 303/151 |
| 6,507,789 B1 | * | 1/2003 | Reddy et al. | 702/34 |
| 6,600,979 B1 | * | 7/2003 | Kumar et al. | 701/20 |

* cited by examiner

Primary Examiner—Eric S. McCall
(74) Attorney, Agent, or Firm—Cantor Colburn LLP

(57) ABSTRACT

An exemplary embodiment of the invention is a method for determining a reference speed approximating a ground speed of a vehicle having a plurality of axles. The method includes selecting a minimum vehicle speed based on one of the axles having a minimum speed. An axle having a lowest amount of creep is determined and designated as a speed axle. A derived speed from the speed axle is obtained and compensated by subtracting a creep value from the derived speed to obtain a corrected speed. Operating dynamics for the vehicle are determined and a reference speed is determined based on the minimum vehicle speed or the corrected speed in response to the operating dynamics.

50 Claims, 12 Drawing Sheets

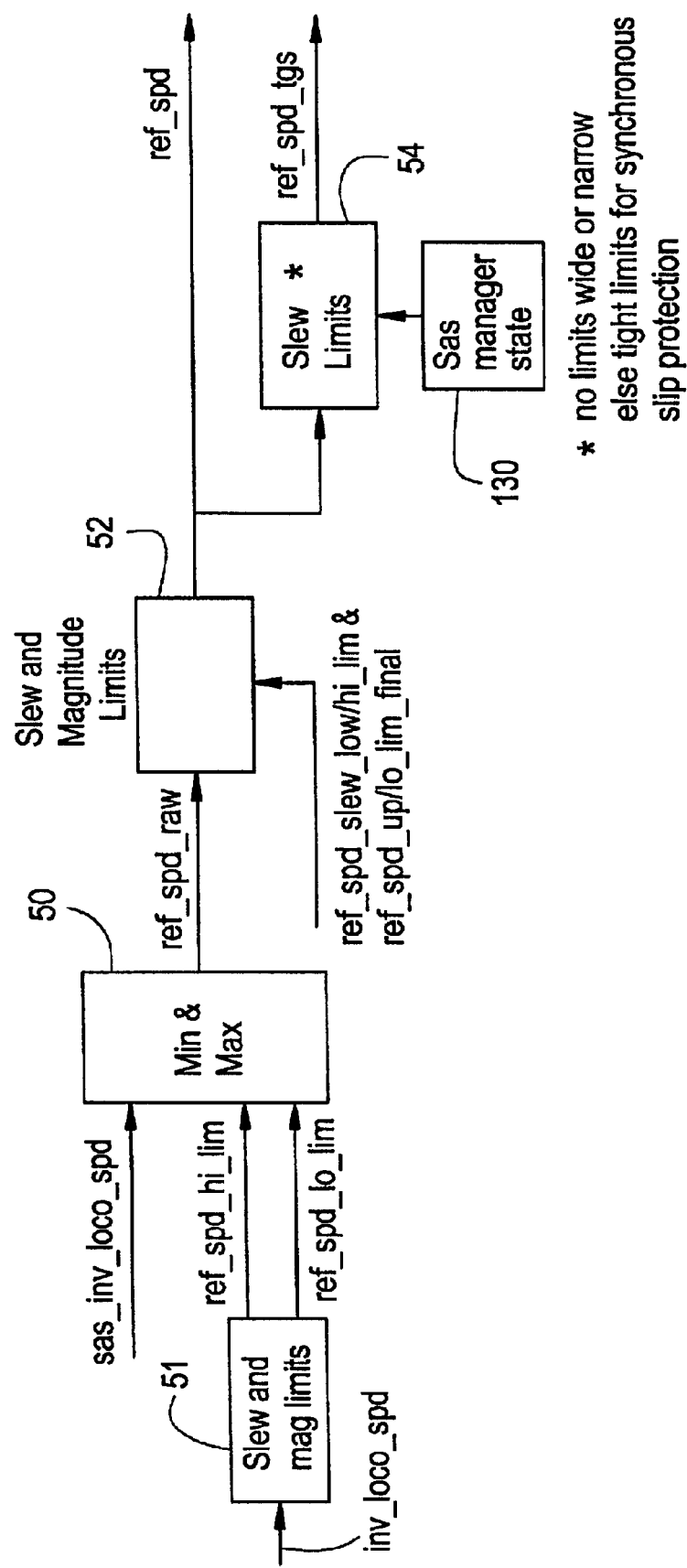

METHOD, SYSTEM AND STORAGE MEDIUM FOR DETERMINING A VEHICLE REFERENCE SPEED

CROSS-REFERENCE TO RELATED APPLICATIONS

This application claims the benefit of U.S. provisional patent application serial No. 60/200,412 filed Apr. 28, 2000, the entire contents of which are incorporated herein by reference.

BACKGROUND OF THE INVENTION

The invention relates generally to a method and system for determining reference speed in a vehicle and in particular to a method and system for determining a reference speed in a locomotive driven by AC motors. Locomotives used for heavy haul applications generally are equipped with speed sensors connected to individual traction motors. Information from these speed sensors are compared with a reference speed estimating the true ground speed for obtaining the maximum adhesion and for wheel slip/slide protection. The estimate of ground speed, or reference speed, relies on individual motor speed sensors along with other ground speed measurements such as radar-based ground speed measurements. The use of radar to estimate ground speed has disadvantages due to cost, accuracy and misoperation due to ground conditions and other environmental conditions. Accordingly, there is a need in the art for a technique for estimating ground speed which does not use radar.

BRIEF DESCRIPTION OF THE DRAWINGS

FIG. 2C is a block diagram of the generation of the reference speed;

SUMMARY OF THE INVENTION

Figure 1:
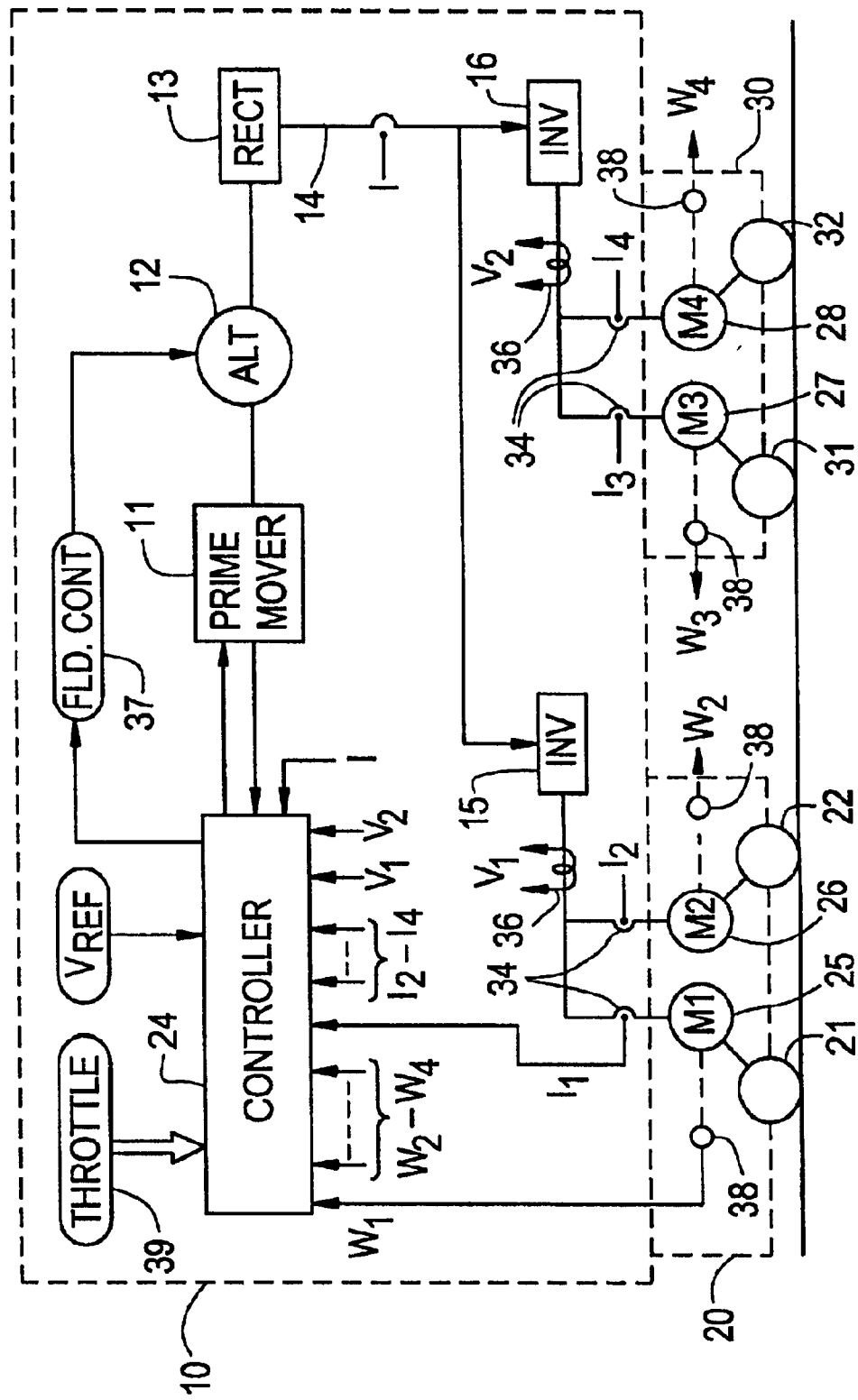
FIG. 1 is a simplified block diagram of a diesel electric locomotive.

An exemplary embodiment of the invention is a method for determining a reference speed approximating a ground speed of a vehicle having a plurality of axles. The method includes selecting a minimum vehicle speed based on one of the axles having a minimum speed. An axle having a lowest amount of creep is determined and designated as a speed axle. Speed from the speed axle is obtained and compensated by subtracting a creep value from the speed to obtain a corrected speed. Operating dynamics for the vehicle are determined and a reference speed is determined based on the minimum vehicle speed or the corrected speed in response to the operating dynamics.

DETAILED DESCRIPTION OF THE INVENTION

The present invention may be utilized in various types of electric motor powered vehicles, such as, for example, off-highway vehicles (earth moving machines), transit cars and locomotives. For purposes of illustration, the invention is described herein as it may be applied to a locomotive. A propulsion system 10 of FIG. 1 includes a variable speed primer mover 11 (e.g., a diesel engine) mechanically coupled to a rotor of a dynamo electric machine 12 comprising a 3-phase alternating current (AC), synchronous generator or alternator. The 3-phase voltages developed by alternator 12 are applied to AC input terminals of a conventional power rectifier bridge 13. The direct current (DC) output of bridge 13 is coupled via a DC link 14 to a number of controlled inverters 15 and 16 which invert the DC power to AC power at a selectable variable frequency. The inverters 15 and 16 are conventional inverters employing high power gate turn-off devices (GTO's) or other solid state devices which switch in and out of conduction in response to gating signals from a system controller 24 so as to invert the DC voltage on DC link 14 to controlled frequency AC voltage. The AC power is electrically coupled in energizing relationship to each of a plurality of adjustable speed AC traction motors 25–28. Prime mover 11, alternator 12, rectifier bridge 13, and inverters 15 and 16 are mounted on a platform of the traction vehicle, illustrated as a 4-axle diesel-electric locomotive. The platform is in turn supported on two trucks 20 and 30, the first truck 20 having two axle-wheel sets 21 and 22 and the second truck 30 having two axle-wheel sets 31 and 32. It is understood that the number of axles may vary.

Each of the traction motors 25–28 is hung on a separate axle and its rotor is mechanically coupled, via conventional gearing, in driving relationship to the associated axle-wheel set. In the illustrative embodiment, the two motors 25 and 26 are electrically coupled in parallel with one another and receive power from inverter 15 while motors 27 and 28 are coupled to inverter 16. However, in some instances, it may be desirable to provide an inverter for each motor or to couple additional motors to a single inverter. The invention is not limited to such 4-axle systems and is equally applicable to 6-axle locomotives with six inverters each connected for powering a respective one of six traction motors each connected to respective ones of the six axles. Suitable current transducers 34 and voltage transducers 36 are used to provide a family of current and voltage feedback signals which are respectively representative of the magnitudes of current and voltage in the motor stators. Speed sensors 38 are used to provide speed signals representative of the rotational speeds W1–W4 in revolutions per minute (RPM) of the motor shafts. These speed signals are readily converted to wheel speed in a well-known manner. For simplicity, only single lines have been indicated for power flow although it will be apparent that motors 25–28 are typically three phase motors so that each power line represents three lines in such applications.

The magnitude of output voltage and current applied to rectifier bridge 13 is determined by the magnitude of excitation current supplied to the field windings of alternator 12 by field controller 37 which may be a conventional phase controlled rectifier circuit since the alternator field requires DC excitation. The excitation current is set in response to an operator demand (throttle 39) for vehicle speed by controller 24 which is in turn responsive to actual speed as represented by signals W1–W4. Controller 24 converts the throttle command to a corresponding torque request for use in controlling motors 25–28. Since AC motor torque is proportional to rotor current and air gap flux, these quantities may be monitored; or, more commonly, other quantities, such as applied voltage, stator current and motor RPM, may be used to reconstruct motor torque in controller 24. See, for example, U.S. Pat. No. 4,243,927. The controller 24 can adjust motor torque in response to throttle commands or in response to a program executed by the controller.

Figure 2A:
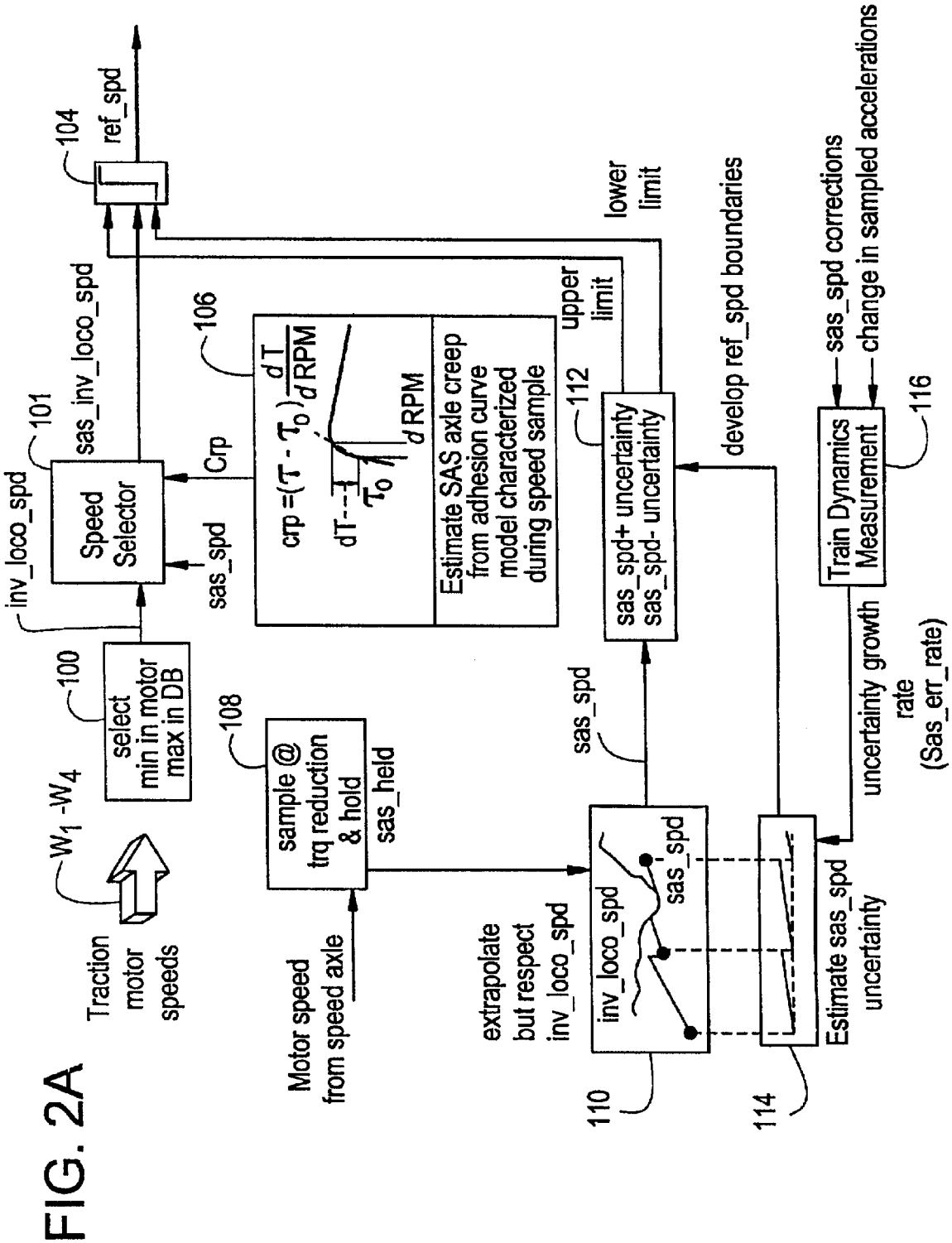
FIG. 2A is a block diagram of a process implemented by the controller of FIG. 1.

In an exemplary embodiment of the invention, the controller 24 executes a program for estimating ground speed also referred to as a reference speed. FIG. 2A is a block diagram of processing performed by the controller 24 in response to a computer program stored in a storage medium to determine a reference speed. The process shown in FIG. 2A is for use with a locomotive traveling in the forward direction operating in motoring or braking modes. It is understood that the invention may be applied to locomotives traveling in an opposite direction by changing the polarity of operations and/or signals shown in FIG. 2A. As described herein, the polarity of certain signals and operations may be reversed depending on the direction of travel of the locomotive. The process shown in FIG. 2A is used in a locomotive having each inverter driving one motor but may be applied to different configurations such as that shown in FIG. 1. The controller may operate in three modes, namely backup mode, wide mode and narrow mode as described herein.

The controller 24 receives speed signals W1–W4 generated by speed sensors 38. The controller 24 then determines the axle having the minimum speed and selects the minimum speed as shown at 100 to obtain a measured speed signal inv_loco_spd. The selection of the minimum speed occurs periodically (e.g., every 20 ms) and thus the measured speed signal inv_loco_spd may be derived from multiple axles. The minimum speed is used because the axle having the minimum speed is experiencing the least amount of slip and thus is closest to the actual ground speed of the locomotive.

Figure 4:
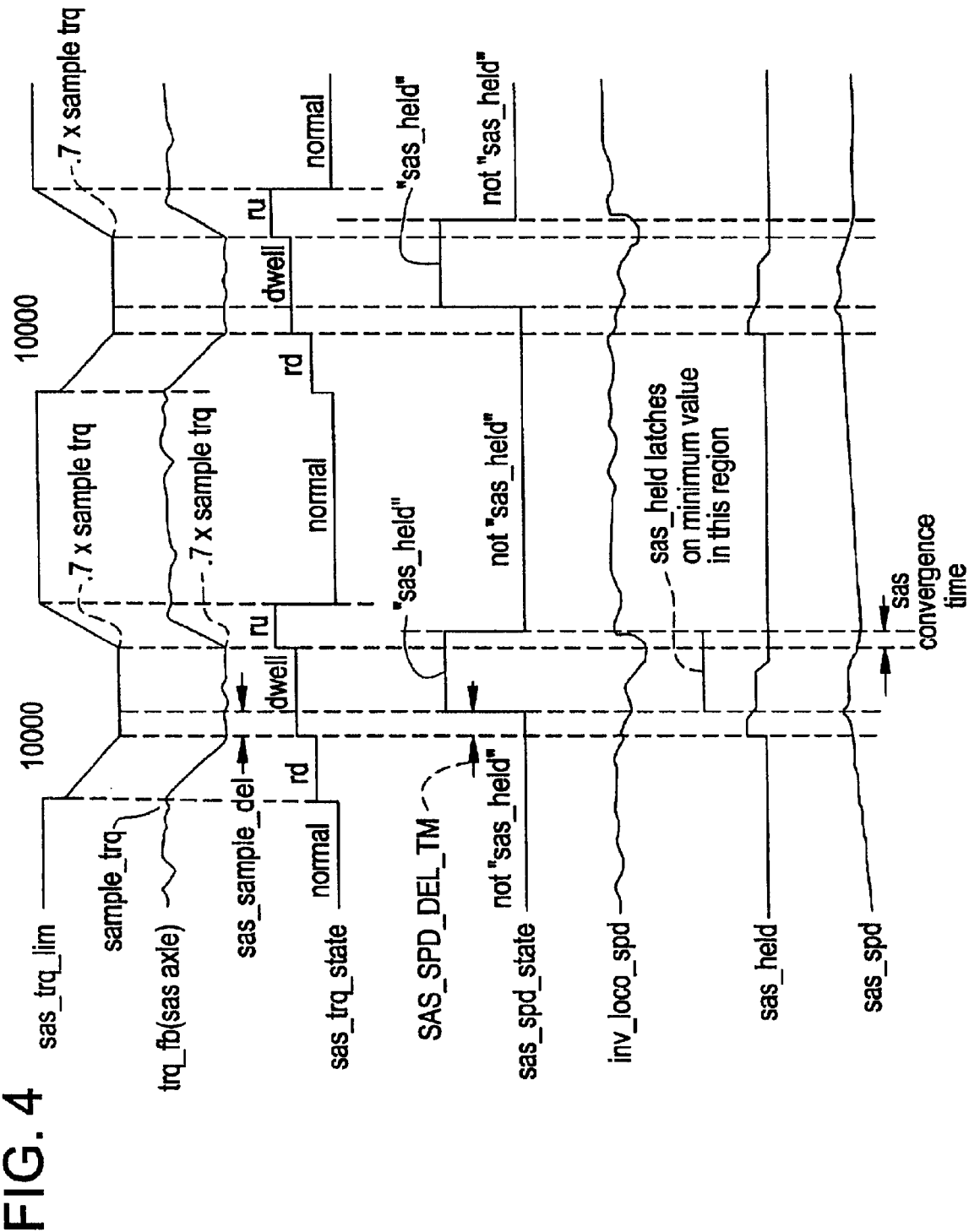
FIG. 4 is a timing diagram.

A derived speed signal sas_spd is also determined based on an axle referred to as the speed axle. The speed axle is selected as the axle having the least amount of creep at the time of sampling. The sampling time is shown in FIG. 4 when the signal sas_qtr_state changes from normal to rd as described herein. The speed axle may also generate the measured speed signal inv_loco_spd if the speed axle has the minimum speed of all axles. Derivation of the derived speed signal sas_spd is described herein. The measured speed signal inv_loco_spd and the derived speed signal sas_spd are provided to a speed selection step 101. A creep value crp is also used in the speed selection step 101 to adjust the derived speed signal sas_spd as described herein with reference to FIG. 2B. As is known in the art, creep is often used to improve traction by allowing the wheels to turn faster than the train speed. The creep value crp is derived from an adhesion curve 106 relating torque and RPM. As described herein, samples acquired prior to, during and after a torque reduction can be used to determine the slope of the adhesion curve. The adhesion curve may be stored in controller 24 or in a memory device accessible by controller 24. The output of the speed selection step 101 is an adjusted speed sas_inv_loco_spd which is derived as described herein with reference to FIG. 2B.

If the locomotive is traveling in the forward direction but in dynamic braking mode (referred to as DB in step 100), the controller 24 selects the maximum speed at step 100. In dynamic braking, the locomotive is driving the motors (which may act as generators) and thus slip occurs in the opposite direction of the wheel rotation. Thus, the maximum speed value has the least slip and is closest to the ground speed.

The adjusted speed sas_inv_loco_spd is then applied to a slew rate and magnitude limiter 104 which applies a rate limit, an upper limit and a lower limit to the adjusted speed to output a reference speed shown as ref_spd. If the adjusted speed exceeds the upper limit, the limiter 104 outputs the upper limit and similarly if the adjusted speed exceeds the lower limit, the limiter 104 outputs the lower limit. The upper limit and lower limit are based on sampled speed values and uncertainty values as described herein. The limiter 104 prevents speed aberrations (e.g., high speeds due to wheel slip) from contributing to the reference speed. In addition to speed magnitude limits, the rate of change or slew in the reference speed may also be limited based on the locomotive application. The rate limit for the reference speed may be based on the locomotive application so that a heavy train has a low rate limit, a light train has a medium rate limit and a free locomotive (i.e., no cars coupled to the locomotive) has a high rate limit. The rate limit may also differ depending on whether the locomotive is accelerating or decelerating. The rate limit eliminates any remaining slip to provide a reference speed signal close to the ground speed of the locomotive.

Figure 3:
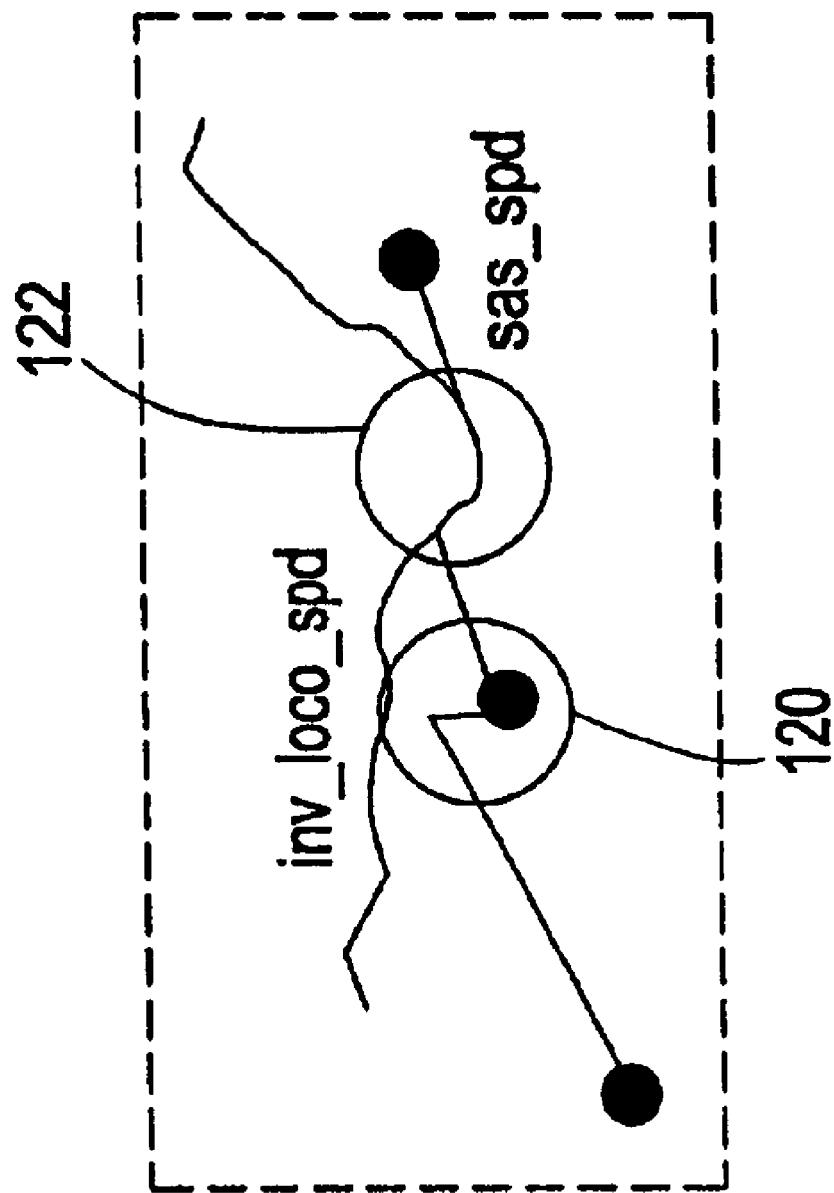
FIG. 3 is a plot of a minimum speed signal and a sampled first order hold speed signal.

To determine the derived speed signal sas_spd, the controller 24 reduces the torque on the motor coupled to the speed axle and samples the speed of the speed axle while the motor is in a reduced torque state. By reducing the torque, the effects of slip and creep are reduced and the wheel and axle are allowed to rotate closer to the ground speed. The controller 24 reduces the torque to the speed axle and samples the speed periodically through sample and hold process 108 to derive sampled speed values sas_held. As described in detail with reference to FIG. 4, the torque is ramped down, held at a reduced value and then ramped back up to the normal operating value. The samples acquired by the sample and hold process 108 are obtained during the period of reduced torque. The sampled speed values obtained during the reduced torque period are representative of ground speed of the locomotive. The sampled speed values sas_held are stored (either in controller 24 or in memory accessible by controller 24) and then processed by extrapolation process 110 to obtain a derived speed signal sas_spd. The extrapolation between sampled speed values sas_held is limited by the measured speed signal inv_loco_spd provided from the motor having the minimum speed. The extrapolation between sampled speed values sas_held is not permitted to exceed the measured speed signal inv_loco_spd. FIGS. 1 and 3 depict a first order hold extrapolation, but it is understood that other order holds may be used and the invention is not limited to first order hold extrapolation.

The derived speed signal sas_spd is provided to a boundary determination process 112 where an uncertainty signal (also referred to as sas_err_lim) is added to the derived speed signal sas_spd to provide the upper limit used by limiter 104 to limit the upper value of adjusted speed signal sas_inv_loco_spd when the controller is in wide or narrow mode. The uncertainty signal is subtracted from the derived speed signal sas_spd to provide the lower limit used by limiter 104 to limit the lower values of the adjusted speed signal sas_inv_loco_spd when the controller is in wide or narrow mode. In backup mode, the upper and lower magnitude limits are pre-defined.

The uncertainty signal is provided by an uncertainty estimation step 114 which provides the uncertainty signal to the boundary determination step 112. As shown in FIG. 2A, the uncertainty signal increases in between sampled speed values sas_held. A limit may be applied to the uncertainty signal. At sample time, upon reaching a sampled speed value sas_held, the uncertainty drops to zero because the sampled speed value sas_held is based on actual measurements of speed.

Several factors contribute to the magnitude of the uncertainty signal provided by uncertainty estimator 114. One factor is the amount of correction between the derived speed signal sas_spd and the sampled speed value sas_held. FIG. 3 is a plot of the measured speed signal inv_loco_spd and the derived speed signal sas_spd. As shown in region 120 of the plot of the derived speed signal, the derived speed signal sas_spd changes rapidly upon obtaining a new sampled speed value sas_held. This indicates that the extrapolation does not truly represent the axle speed and can be considered a correction to the extrapolation. The degree of uncertainty is directly related to the amount of correction in the derived speed signal. Another correction affecting the magnitude of the uncertainty signal is the correction shown in region 122 of the plot of the measured speed signal inv_loco_spd and the derived speed signal sas_spd. In region 122, the derived speed signal is corrected due to the derived speed signal sas_spd exceeding the measured speed signal inv_loco_spd. In this situation, the derived speed signal sas_spd is corrected by setting the derived speed signal sas_spd equal to the measured speed signal inv_loco_spd. Again, the degree of uncertainty is directly related to the amount of correction in the derived speed signal.

The uncertainty signal is also affected by changes in acceleration occurring between samples of the sampled speed values sas_held. Changes in acceleration (also referred to as jerk) of the locomotive increases uncertainty in the ability to predict locomotive speed. Accordingly, if changes in acceleration occur between samples of sas_held, the uncertainty signal will be higher.

A train dynamics measurement process 116 determines the nature of the locomotive operation and determines an uncertainty based on the locomotive operating dynamics, the corrections to the derived speed signal sas_spd and the presence of changes in acceleration between sampled speed values sas_held. An uncertainty growth rate (also referred to as sas_err_rate) is used as the rate of the uncertainty signal generated at the uncertainty estimation step 114. The locomotive operating dynamics also affect uncertainty. For example, in applications where a locomotive is coupled to a heavy train, the heavy train is less susceptible to accelerations and decelerations and thus there is a relatively low uncertainty in the derived speed signal sas_spd. Such applications are also referred to herein as having narrow uncertainty and the controller 24 operates in narrow mode. Narrow applications have a low uncertainty growth rate. By contrast, a light train is more susceptible to accelerations and decelerations than a heavy train. Light trains thus have a higher uncertainty in the derived speed signal sas_spd. Such applications are also referred to herein as having wide uncertainty and the controller 24 operates in wide mode. Wide applications have a higher uncertainty growth rate.

The controller 24 may implement all the processes depicted in FIG. 2A in response to a computer program provide in a storage medium and executed by a microprocessor in controller 24. Alternatively, the steps shown in FIG. 2A may be implemented using a combination of software, firmware and/or hardware.

Figure 2B:
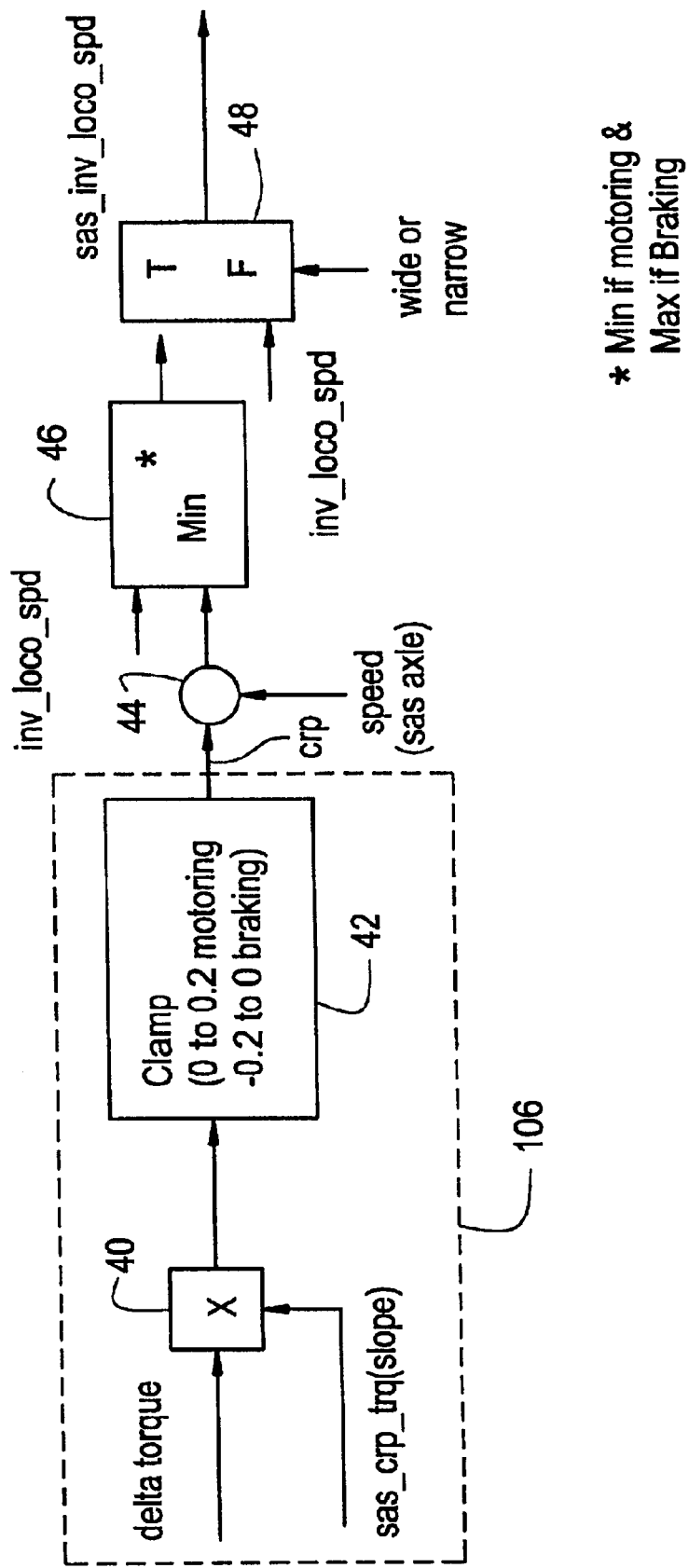
FIG. 2B is a block diagram of the generation of the adjusted speed.

FIG. 2B shows the processing performed by the speed selection step 101. The creep value crp from creep process 106 is determined by multiplying a change in torque on the speed axle, delta torque, by a slope of the adhesion curve, sas_crp_trq (slope), by multiplier 40. As described herein, the slope of the adhesion curve is determined based on speed and torque samples taken before, during and after the reduced torque state. The creep value from multiplier 40 is then limited by a clamp 42. The limit imposed by clamp 42 is positive if the locomotive is motoring in a forward direction and negative if the locomotive is traveling in the forward direction but in dynamic braking mode. The creep value is then continuously subtracted from the speed of the speed axle at summer 44 and the corrected speed signal and the measured speed signal inv_loco_spd are provided to a selector 46. If the locomotive is motoring in the forward direction, the selector 46 selects the minimum signal. In this condition, the minimum signal is closest to the ground speed. As noted in FIG. 2B, if the locomotive is traveling forward but in dynamic braking, the selector 46 selects the maximum speed. The output of selector 46 is provided to selector 48 which is controlled by the state of the controller 24. If the controller is in wide or narrow mode, the derived speed signal sas_spd is reliable and the selector 48 selects the output of the selector 46 which may be the sas_spd or the inv_loco_spd. If, however, the controller is not in wide or narrow mode but rather is in backup mode, then the measured speed signal inv_loco_spd is selected by selector 48. This output of the selector 48 is the adjusted speed signal sas_inv_loco_spd.

FIG. 2C depicts an exemplary implementation of the limiter 104. The measured speed signal inv_loco_spd is provided to a slew and magnitude limiter 51. The slew and magnitude limiter 51 adds a positive predefined value to the speed signal to generate an initial upper limit ref_spd_hi_lim. The slew and magnitude limiter 51 adds a negative predefined value, which may equal the magnitude of the positive predefined value, to the speed signal to generate an initial lower limit ref_spd_lo_lim. As shown in FIG. 2C, the inputs adjusted speed signal sas_inv_loco_spd and initial upper and initial lower limits ref_spd_hi_lim and ref_spd_lo_lim are provided to a min/max selector 50 which selects the adjusted speed unless the adjusted speed exceeds a limit, in which case the selector 50 selects the exceeded limit. The initial upper and initial lower limits may be based on predefined speed limits. The selector 50 outputs a raw reference speed labeled ref_spd_raw. The raw reference speed is provided to a limiter 52 which imposes slew limits (ref_spd_slew_low/hi_lim) and final upper and lower limits (ref_spd_up/lo_lim_final). The slew limits control rate of change of the reference speed and are described in further detail with reference to FIG. 2D. The final upper and final lower magnitude limits may vary depending on the mode of the controller 24. In backup mode, the final upper and final lower magnitude limits equal the initial upper and lower limits, respectively, imposed by min/max selector 50. If the controller 24 is in the wide or narrow mode, the final upper limit equals the derived speed signal sas_spd plus the uncertainty signal shown at 114 in FIG. 2A. Similarly, if the controller 24 is in the wide or narrow mode, the final lower limit equals the derived speed signal sas_spd minus the uncertainty signal shown at 114 in FIG. 2A.

The output of the limiter 52 provides the reference speed ref_spd. The output of the limiter 52 is also applied to a slew limiter 54 which produces a designate axle reference speed ref_spd_tgs. As described herein, one axle is selected as a designated axle and creep and torque on the designated axle is used to affect the state of the controller 24. If the controller 24 is in wide or narrow mode, as indicated by state manager machine 130, then no limits are imposed by slew limiter 54 and the reference speed for the designated axle is equal to the reference speed ref_spd. If the controller is not in wide or narrow mode (i.e., in backup mode) then tight slew limits are applied by limiter 54. This allows slip of the designated axle to be detected and corrected by reducing torque to the slipping axle as is known in the art. This also provides protection against synchronous slips.

Figure 2D:
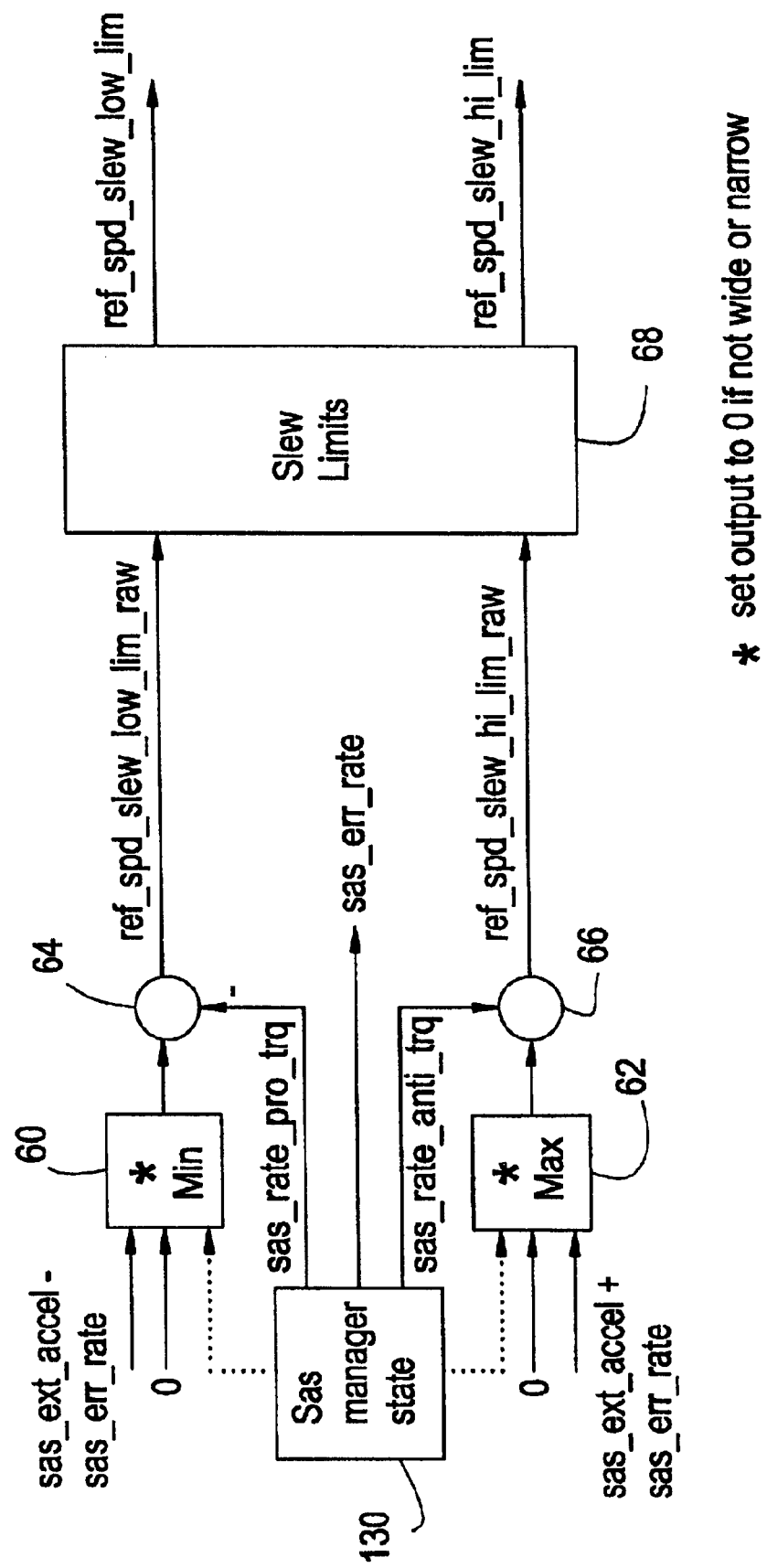
FIG. 2D is a block diagram of the generation of a raw reference speed and the reference speed slew limits.

FIG. 2D depicts generation of the reference speed slew limits ref_spd_slew_low_lim and ref_spd_slew_hi_lim used by limiter 52 in FIG. 2C. The manager state machine 130 outputs the controller state to minimum selector 60 and maximum selector 62. If the controller 24 is not in the wide or narrow state (i.e., in the backup mode), the minimum selector 60 and maximum selector 62 output zero. If the controller 24 is in wide mode or narrow mode, the minimum selector 60 outputs the lesser of (sas_ext_accel-sas_err_rate) and zero. The measured acceleration sas_ext_accel minus the uncertainty sas_err_rate represents the minimum acceleration achievable by the locomotive. If the controller 24 is in wide mode or narrow mode, the maximum selector 62 outputs the larger of (sas_ext_accel+ sas_err_rate) and zero. The measured acceleration sas_ext_accel plus the uncertainty sas_err_rate represents the maximum acceleration achievable by the locomotive. The sas_err_rate corresponds to the uncertainty growth rate in FIG. 2A and is determined by the state of controller 24. In wide mode, uncertainty is higher than in narrow mode. Thus, the sas_err_rate will be larger in wide mode than in narrow mode.

A reference speed rate limit in the direction of the tractive effort, sas_rate_pro_trq, is subtracted from the output of minimum selector 60 at summer 64. The reference speed rate limit in the direction of the tractive effort will vary depending on the mode of the controller 24. In narrow mode (implying a heavy train) the locomotive cannot accelerate as fast as in wide mode (implying a light train). Thus, the reference speed rate limit in the direction of the tractive effort in narrow mode is less than that in wide mode. The controller may also assume a yard state indicating that the locomotive is not coupled to any cars. In this state, the reference speed rate limit in the direction of the tractive effort is greater than that in narrow mode. The output of the summer 64 is a raw lower limit on the rate of change in the reference speed shown as ref_spd_slew_low_lim_raw.

A reference speed rate limit in the direction opposite the tractive effort, sas_rate_anti_trq, is added to the output of maximum selector 62 at summer 66. The reference speed rate limit in the direction opposite the tractive effort will vary depending on the mode of the controller 24. A change in ref_spd_raw opposite the direction of the tractive effort beyond the rate provided for by (sas_ext_accel-sas_err_rate) is normally caused by a reduction in creep which is an unwanted component of the adjusted speed signal sas_inv_loco_spd. A large value of sas_rate_anti_trq will promote rejection of the creep from the reference speed signal ref_spd. The reference speed rate limit in the direction opposite the tractive effort in narrow mode may equal that in wide mode. The controller may also assume a yard state indicating that the locomotive is not coupled to any cars. In this state, the reference speed rate limit in the direction opposite the tractive effort is greater than that in narrow and wide modes. The output of the summer 66 is a raw upper limit on the rate of change in the reference speed shown as ref_spd_slew_hi_lim_raw.

The raw lower limit on the rate of change in the reference speed and the raw upper limit on the rate of change in the reference speed are applied to a slew limiter 68 which generates a lower limit on the rate of change in the reference speed (ref_spd_slew_low_lim) and an upper limit on the rate of change in the reference speed (ref_spd_slew_hi_lim). Slew limiter 68 will use the raw limits unless the raw limits exceed predefined slew limits in which case the predefined slew limits are output. The reference speed slew limits are then used by limiter 52 as described herein.

FIG. 4 is a timing diagram of multiple signals in the process of altering torque to the speed axle and deriving the derived speed signal sas_spd. The first three waveforms relate to the altering of the torque to the motors coupled to the speed axle. The waveform sas_trq_lim is a torque command signal provided to the motor. As shown in this waveform, the torque command signal is reduced to approximately 70% of the operating torque shown as sample_trq. The next waveform trq_fb (sas axle) depicts the torque produced by the motor and generally follows the torque command signal. This signal is sampled prior to reducing the torque limit to derive the sample_trq value. The next waveform sas_trq_state is a state transition waveform having four modes. The motor is initially in a normal mode represented by the term "normal." The torque is then ramped down (designated by "rd"), held at the reduced torque values (designated by "dwell") and ramped up to the normal operating torque (designated by "ru"). The period between the torque reductions may be determined based on train dynamics as described herein.

The next four waveforms relate to the acquisition of the derived speed signal sas_spd. As shown in FIG. 4, the state signal sas_spd_state is changed from a no sample state to a sample state shortly after the torque dwell state is entered. The measured speed signal inv_loco_spd is also shown in FIG. 4 due to its limiting effect on the derived speed signal sas_spd. The sas_held waveform provides the sampled speed values sas_held in the response to the state signal sas_spd_state entering the sample state. The sas_spd waveform represents the extrapolated, derived speed signal as limited by the measured speed signal inv_loco_spd as described above.

Figure 5:
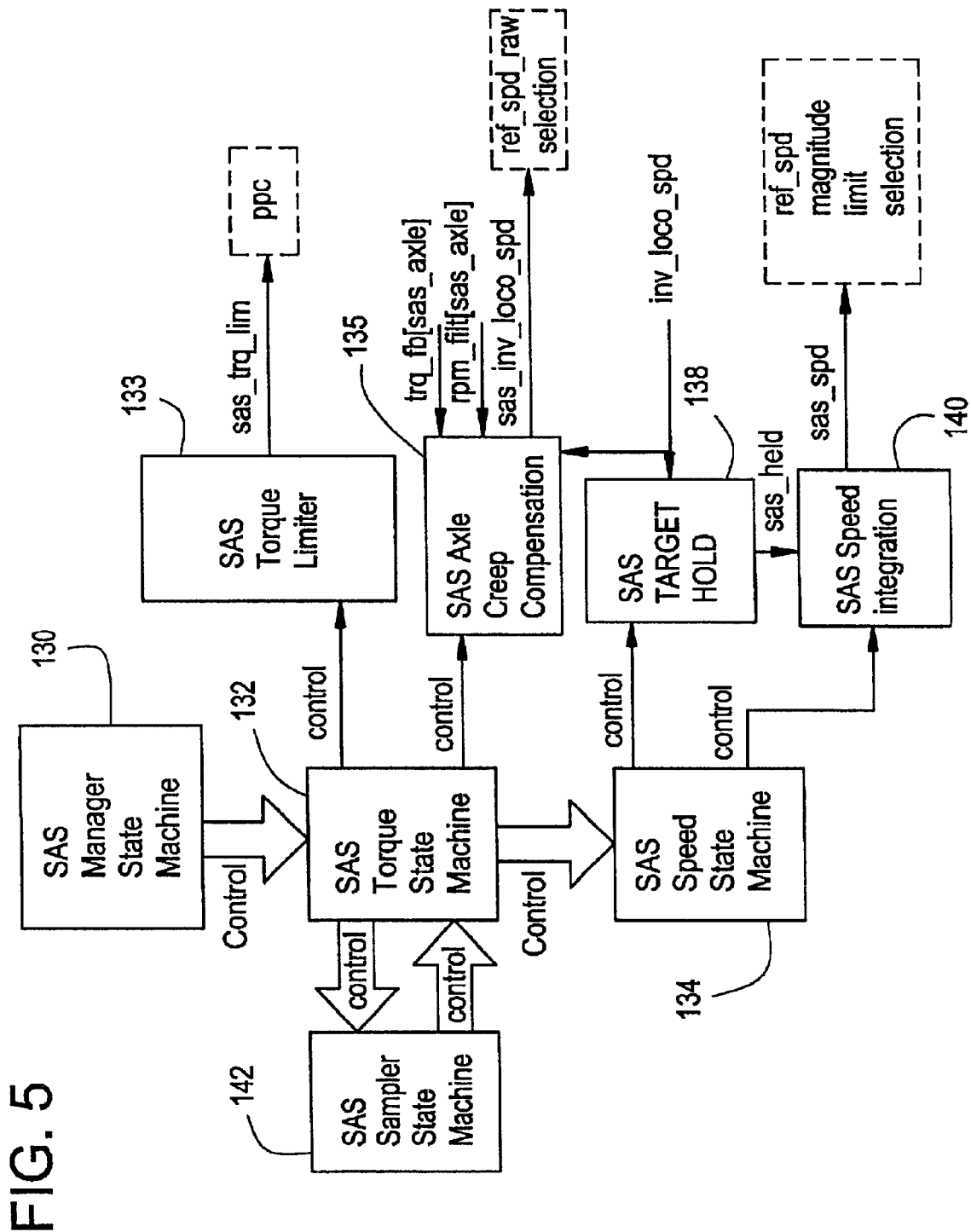
FIG. 5 is a block diagram of a number of devices implemented by the controller of FIG. 1.

FIG. 5 is an overall block diagram of operation of controller 24. The controller 24 performs tasks corresponding to a number of devices shown in FIG. 5. A manager state machine 130 controls the overall state of the system. A torque state machine 132 controls torque applied to one or more axles through a torque limiter 133. Torque state machine 132 also facilitates creep estimation of the speed axle through axle creep compensation device 135. The speed state machine 134 controls sampling of sampled speed values sas_held through target hold device 138. The speed state machine 134 also controls derivation of the derived speed signal sas_spd through speed integration device 140. A sampler state machine 142 determines the appropriate sampling rate to be used by the target hold device 138 in obtaining sampled speed values sas_held.

Various operating states of the controller 24 will now be described. There are multiple states for the controller 24 which are discussed with reference to FIG. 6. In order to transition between states, information is monitored from two different axles on the locomotive. A first axle is referred to as the speed axle and a second axle referred to as the designated axle. Measurements from the designated axle may be compared to predetermined limits to control the state of the controller as described herein.

Figure 6:
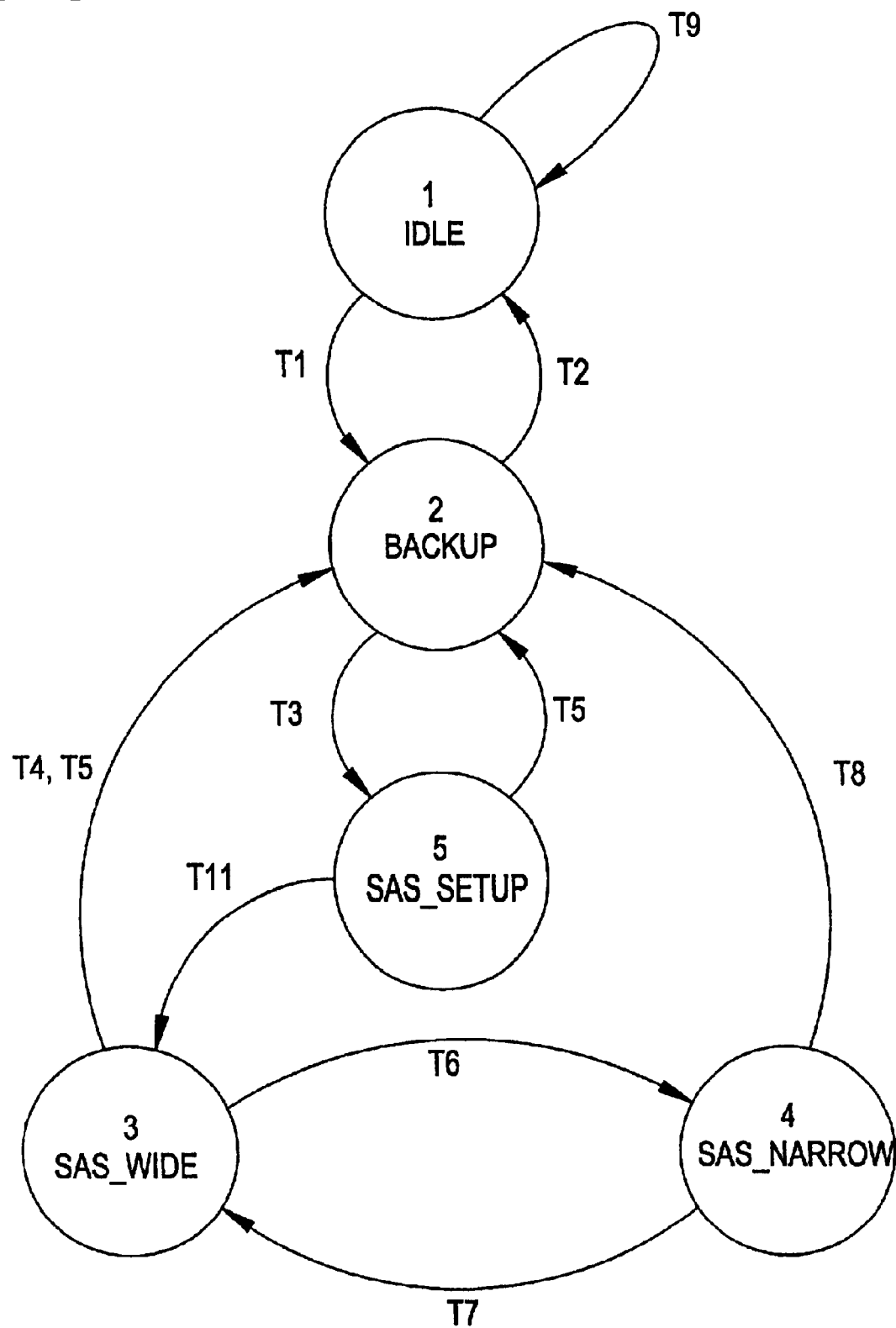
FIG. 6 is a state diagram for the manager state machine of FIG. 5.

FIG. 6 depicts a state diagram for the state manager machine 130. The state manager machine 130 controls the overall state of the controller 24 and dictates what speed determination methodology is implemented by the controller 24. There are three modes for determining locomotive speed when in a powered mode namely, backup mode (state 2), wide mode (state 3) and narrow mode (state 4). The state manager machine is initially in an idle state 1. If there is an operator direction change command represented by transition T9, the state manager device 130 remains in idle state 1 but all memory of train dynamics is rejected. This means that upon an operator direction change command, the operating state of the locomotive must be reestablished. Transition T1 from idle state 1 to backup state 2 occurs if the locomotive is motoring or braking. Transition T2 returns to the idle state 1 and occurs when the locomotive is not (motoring or braking). The transitions described herein are based on Boolean expressions and thus parentheses are considered in evaluating a transition. For example, the condition not (motoring or braking) is true when both motoring and braking are false. The backup mode for determining the reference speed uses the inv_loco_spd as the basis for the reference speed as described above with reference to FIG. 2B. In backup mode, the lead axle (i.e., the axle most forward in the direction of travel) is used to control wheel slip and synchronous slip. This is indicated in FIG. 2C in which tight limits are applied by limiter 54 when the controller 24 is not in wide or narrow mode.

In certain situations, the derived speed signal sas_spd may be used to derive the reference speed. To initiate this process, transition T3 requires the Boolean expression:

(high motoring notches and low speed) or (high braking effort and low speed and heavy train)

to be true. A heavy train is detected by the transition into sas_narrow state 4 which occurs when very low train dynamics are measured. Alternatively, a heavy train may be detected based on an operator initiated command or by determining inertia of the train through known sensing techniques. The first condition represents a locomotive in a high tractive effort application. The second condition represents a heavy train in a braking condition. A light train in a braking condition will have excessive jerk rendering the reduced torque speed sampling process inapplicable. Braking train dynamics are typically larger than in motoring due to possible air brake application.

If T3 is true, the state manager enters setup state 5 which initiates the speed sampling process shown in FIG. 2. Sampled speed values sas_held are acquired until a sufficient number of samples are obtained. Transition T11 becomes true when enough samples have been obtained leading to wide state 3. The state manager will remain in wide state 3 unless transition T6 becomes true. Transition T6 is true when the Boolean statement:

(motoring or heavy train) and (jerk and ils correction and spd correction all consistently below low threshold) and (enough samples)

is true. The motoring condition indicates that the locomotive is traveling in either forward or reverse in the motoring state. The heavy train flag is a memory of the previous successful motoring transition to sas_narrow state 4 and no train dynamics measurements since this transition which conflict with the heavy train assumption. This flag is used to permit operation in the sas_wide state 3 in braking mode. The jerk condition is based on the change in acceleration on the speed axle. The controller 24 stores low and high thresholds for jerk. The jerk limits may vary depending on the mode of controller 24. The Boolean condition can only be true if the jerk on the designated axle is consistently (e.g., for a predetermined amount of time or samples) below the lower threshold. This indicates more consistent speed and thus, narrow uncertainty.

The ils correction refers to the amount of correction in the derived speed signal sas_spd due to the measured speed signal inv_loco_spd as described above with reference to region 122 of FIG. 3. The controller 24 stores a low and high threshold for the ils correction. In order to transition from wide state 3 to narrow state 4, the ils correction must be consistently (e.g., for a predetermined amount of time or samples) below the low threshold. The spd correction refers to the amount of correction in the derived speed signal sas_spd due to extrapolation error as described above with reference to region 120 of FIG. 3. The controller 24 stores a low and high threshold for the spd correction. In order to transition from state 3 to state 4, the spd correction must be consistently (e.g., for a predetermined amount of time or samples) below the low threshold.

Transition from the narrow state 4 to the wide state 3 occurs when transition T7 is true. Transition T7 is true when the Boolean statement:

(jerk>jerk low threshold) or (ils correction>ils correction low threshold) or (spd correction>spd correction low threshold)

is true. If transition T7 is true, there is too much uncertainty and the state transfers from the narrow state 4 to the wide state 3.

Both the wide state 3 and the narrow state 4 involve reducing torque on a selected motor and sampling speed values as described above with reference to FIG. 2A. In addition, both the wide state 3 and the narrow state 4 use the trailing axle as the designated axle to detect instantaneous jerk and creep exceeding predefined limits. Differences in the processing performed in the wide state and the narrow state are described herein.

The controller 24 will return to backup mode if any of transition T4 or transition T5 or transition T8 is true. Transition T5 is true when the Boolean expression not (high notches or low speed) is true (i.e., either high notches or low speed are false). Transition T8 is based on the same Boolean condition as transition T5.

Transition T4 occurs when the following Boolean expression (jerk>jerk high threshold) or (ils correction>ils correction high threshold) or (spd correction>spd correction high threshold)

is true. When change in the sampled acceleration, the ils correction or the spd correction exceeds it respective high threshold, this indicates that neither the wide mode nor the narrow mode of determining reference speed is suitable and the controller returns to the backup state 2.

Figure 7:
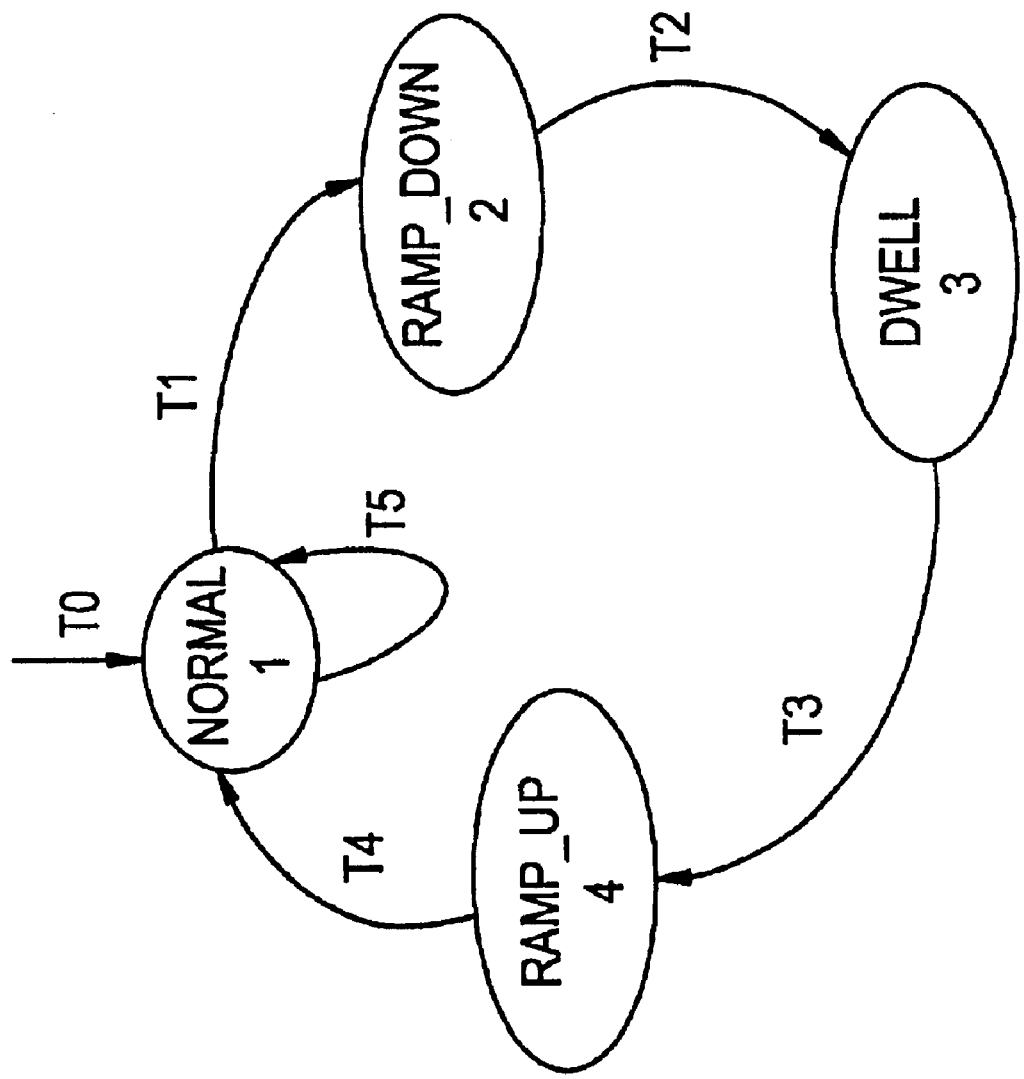
FIG. 7 is a state diagram of the torque state machine of FIG. 5.

The operation of the torque state machine 132 will now be described with reference to FIG. 7 which is a state diagram for the torque state machine 132. The torque state machine 132 operates in conjunction with the torque limiter 133 to perform the torque reduction on the speed axle. The torque state machine 132 is operational when the manager state machine 130 is in the setup state 5, the wide state 3 or the narrow state 4. This condition is represented by the T0 transition shown in FIG. 7. The torque state machine 132 starts in a normal state 1 in which the torque to the speed axle is provided at a normal operating level as demanded by the application. When a sampled speed value sas_held is needed, transition T1 becomes true. The sampled speed value may be required at a predetermined time (e.g., every 10 seconds) or may be initiated in response to a command from the sampler state machine 142 described herein. Transition T1 leads to ramp down state 2 in which the torque applied to the speed axle is reduced to a target level by torque limiter 133. Transition T1 includes determining which axle has the minimum speed (maximum speed in dynamic braking mode) as shown at step 100. A torque limit is set and may be predetermined value or a value corresponding to a predetermined percentage (e.g., 70%) of the normal operating torque prior to the torque reduction. The speed and torque of the speed axle are sampled prior to entering ramp down state 2 and are referred to as the pre-sample speed and pre-sample torque.

Upon entering the ramp down state 2, the torque limiter 133 reduces torque on the speed axle until the torque is within a predetermined value (e.g., 250 ft. lbs) of the torque limit. When the torque is close enough to the torque limit, transition T2 becomes true and the dwell state 3 is entered. During the dwell state 3, the torque and speed are sampled to provide a sampled speed and a sampled torque. As described above, during the period of reduced torque, the speed state machine 134 controls sampling of speed sample values sas_held by target hold device 138. When a predetermined time has expired, transition T3 becomes true. The torque limit is then reset to a maximum value.

Upon entering the ramp up state 4, the torque limiter 133 increases the torque on the speed axle until the torque is within a predetermined value (e.g., 250 ft. lbs) of the operating torque for the speed axle. Once this condition is met, transition T4 becomes true and the torque state machine enters the normal state 1. Upon entering the normal state 1 from the ramp up state 4, the speed and torque of the speed axle are sampled and are referred to as the post-sample speed and post-sample torque. The sampling of the post-sample speed and post-sample torque occurs when transition T5 is true. Transition T5 becomes true when a predetermined period of time has passed from the dwell state 3. The predetermined period of time may be measured from transition T3 or from transition T4 and will vary depending upon the basis for measurement.

Using the pre-sample speed, pre-sample torque, sampled speed, sampled torque, post-sample speed and post-sample torque, the slope of the adhesion curve 106 shown in FIG. 2A can be computed. The speed and torque values are used to determine the dT and dRPM values for the adhesion curve 106.

Operation of the sampler state machine 142 will now be described. The sampler state machine 142 adjusts the time period between the end of torque ramp up to the beginning of a subsequent torque ramp down. This time period can be adjusted based on a number of factors. To reduce the period between torque reductions, the Boolean expression:

(at least four seconds in normal mode) and
(sas_spd+sas_err_lim<inv_loco_spd) and
((sas_slip_delta>1.5 axles and sas_crp_delta>0.1 mph and sas_te_delta<−4000 ft lb) or (sas_crp_delta>0.15 mph and sas_te_delta<−7500 ft lb))

must be true. Three conditions need to be true for the entire Boolean statement to be true. This first portion of the Boolean statement prevents the period between the end of torque ramp up to the beginning of a subsequent torque ramp down from being less than four seconds.

The second condition indicates that creep starvation may be occurring. Creep starvation is caused by reference speed values significantly less than actual locomotive speed when motoring in the forward direction. This causes measured creep to exceed actual creep and motor torque may be reduced by a wheel slip controller unnecessarily. This condition may be detected if the derived speed signal combined with the sampled speed error is less than the measured speed signal inv_loco_spd. This indicates that the creep level is not appropriate.

The third condition is satisfied if the slip, tractive effort TE and/or the creep indicates that the reference speed is too low. The value sas_slip_delta indicates the change in the number of axles that have been determined to be in a slip state since the most recent speed sample. A slip state is determined if the axle speed exceeds the reference speed by a predetermined amount. The value sas_crp_delta indicates the average amount of measured creep change (per axle) which has occurred since the most recent speed sample. Creep is measured as a difference between wheel speed and the reference speed and thus an increase in creep can indicate that the reference speed is too low. The value sas_te_delta represents the tractive effort change which has occurred since the most recent speed sample. Tractive effort is the force that a locomotive is able to exert. A decrease in tractive effort indicates that the reference speed may be too low.

The third condition is satisfied if the change in slip, change in creep and change in tractive effort exceed predefined limits. Exemplary limits are sas_slip_delta>1.5 axles, sas_crp_delta>0.1 mph and sas_te_delta<−4000 ft lbs. Alternatively, the third condition is met when the change in creep and change in tractive effort exceed further predefined limits. Exemplary further limits are sas_crp_delta>0.15 mph and sas_te_delta<−7500 ft lbs.

When all three conditions are met, this indicates that the reference speed may be too low. The time between the end of torque ramp up to the beginning of a subsequent torque ramp down is reduced to acquire more sampled speed values to increase the accuracy of the reference speed.

Another set of conditions is used to determine if the reference speed may be too high. The reference speed may be too high when the Boolean expression:

(at least four seconds in normal mode) and
((sas_crp_delta<−0.2) or (num_hi_jerk>3) or (sas_ils_corr<−0.2))

is true. The second term indicates a significant reduction in measured creep has occurred singe the last speed sample. The third term indicates that at least four axles have speed signals whose second derivative exceeds a predetermined threshold. This often means operation on the right hand side of the adhesion curve which can be indicative of high reference speed. The fourth term indicates that the derived speed signal sas_spd has undergone significant correction as shown in region 122 of FIG. 3.

Figure 8:
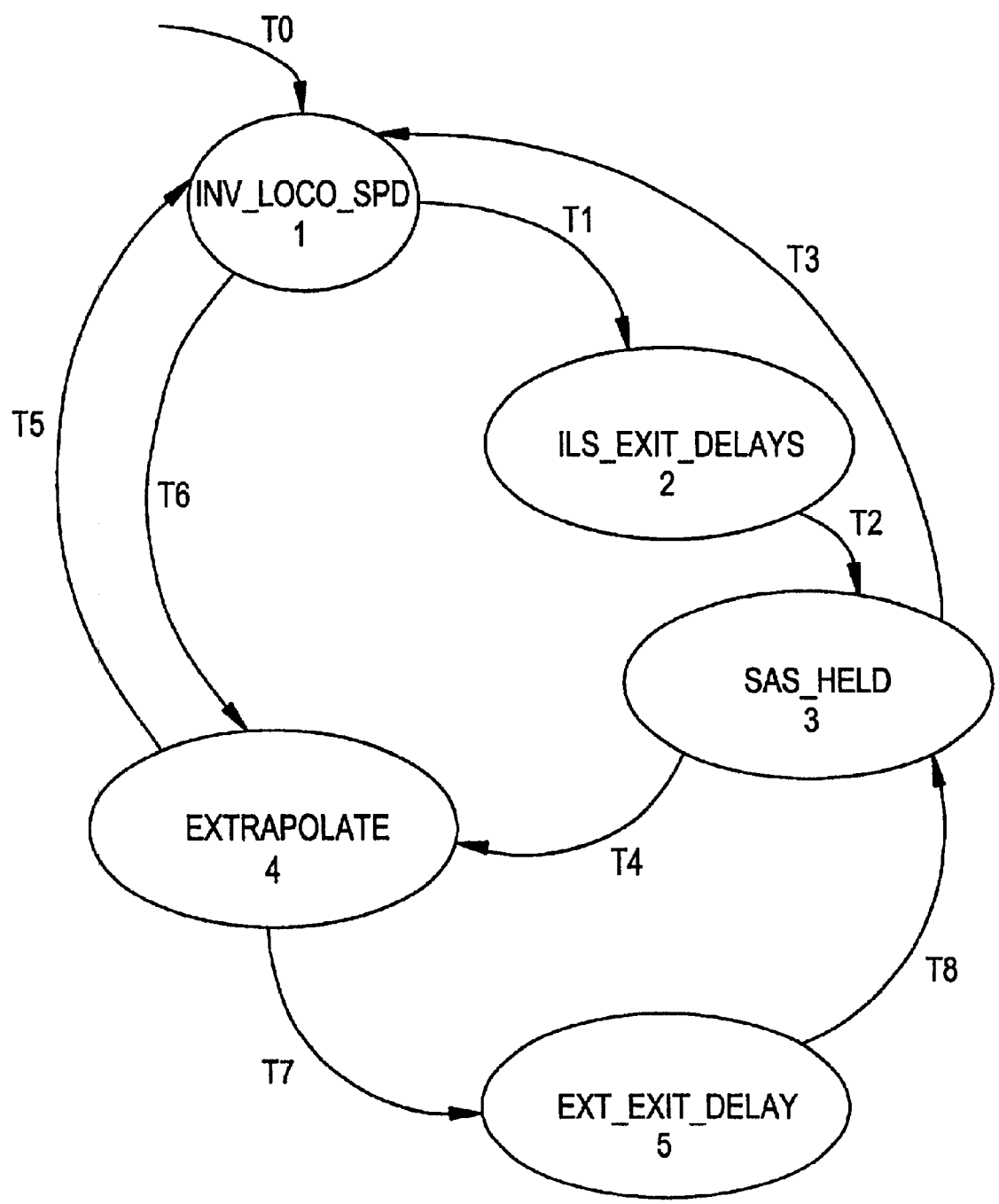
FIG. 8 is a state diagram of the speed state machine of FIG. 5.

FIG. 8 is state diagram for the speed state machine 134 which operates in conjunction with the target hold device 138 to generate sampled speed values sas_held and the speed integration device 140 to generate the derived speed signal sas_spd. The speed state machine 134 is operational when the manager state machine 130 is in the setup state 5, the wide state 3 or the narrow state 4. This condition is represented by the T0 transition shown in FIG. 8. At an initial state 1, the measured speed signal inv_loco_spd is monitored. If the torque reduction has occurred, meaning that dwell state 3 in FIG. 7 has been entered, transition T1 becomes true. Delay state 2 is essentially a time delay and transition T2 becomes true once sufficient time has passed for the measured speed signal inv_loco_spd to settle to a nominal value after the torque reduction. Once T2 becomes true, sample and hold state 3 is entered and sampled speed values sas_held are acquired. From sample and hold state 3, the speed state machine 134 can enter the extrapolate state 4 if the sampled speed has converged (i.e., the sampled speed error is less than a predetermined amount), the reduced torque state has ended and enough samples have been acquired to perform extrapolation. If these three conditions are met, transition T4 becomes true and the extrapolate state 4 is entered. Otherwise, if the reduced torque state has ended and an insufficient number of speed samples have been acquired, transition T3 becomes true and the speed state machine 134 returns to initial state 1.

At extrapolate state 4, the controller 24 determines the speed correction sas_spd_corr described above with reference to region 120 of FIG. 3. The controller 24 also determines the acceleration on the speed axle based on change in speed over the most recent two samples. The controller 24 determines jerk on the speed axle based change in acceleration over the most recent three samples. As described above with reference to FIG. 2A, the speed correction, acceleration and jerk are used to determine uncertainty used in the extrapolation process. The extrapolation between sampled speed values sas_held is performed to generate the sample speed signal sas_spd.

From the extrapolate state 4, the speed state machine 134 can return to initial state 1 if the measured speed signal inv_loco_spd is a better approximation of the ground speed than the derived speed signal sas_spd. The measured speed signal inv_loco_spd is a better approximation if it is lower than the derived speed signal sas_spd. If so, transition T5 becomes true and the speed state machine 134 enters the initial state 1 in which the measured speed signal inv_loco_spd is used as the reference speed.

If the derived speed signal sas_spd generated by the extrapolation process is a suitable measure of reference speed, this value is used. The speed state machine 134 remains in the extrapolate mode until the next torque reduction. When the torque state machine 132 enters the dwell state 3 shown in FIG. 7, transition T7 becomes true and a further delay state 5 is entered. Further delay state 5 is essentially a time delay and transition T8 becomes true once sufficient time has passed for the speed signal inv_loco_spd to settle to a nominal value after the torque reduction. Once T8 becomes true, sample and hold state 3 is entered and sampled speed values sas_held are acquired.

Figure 9:
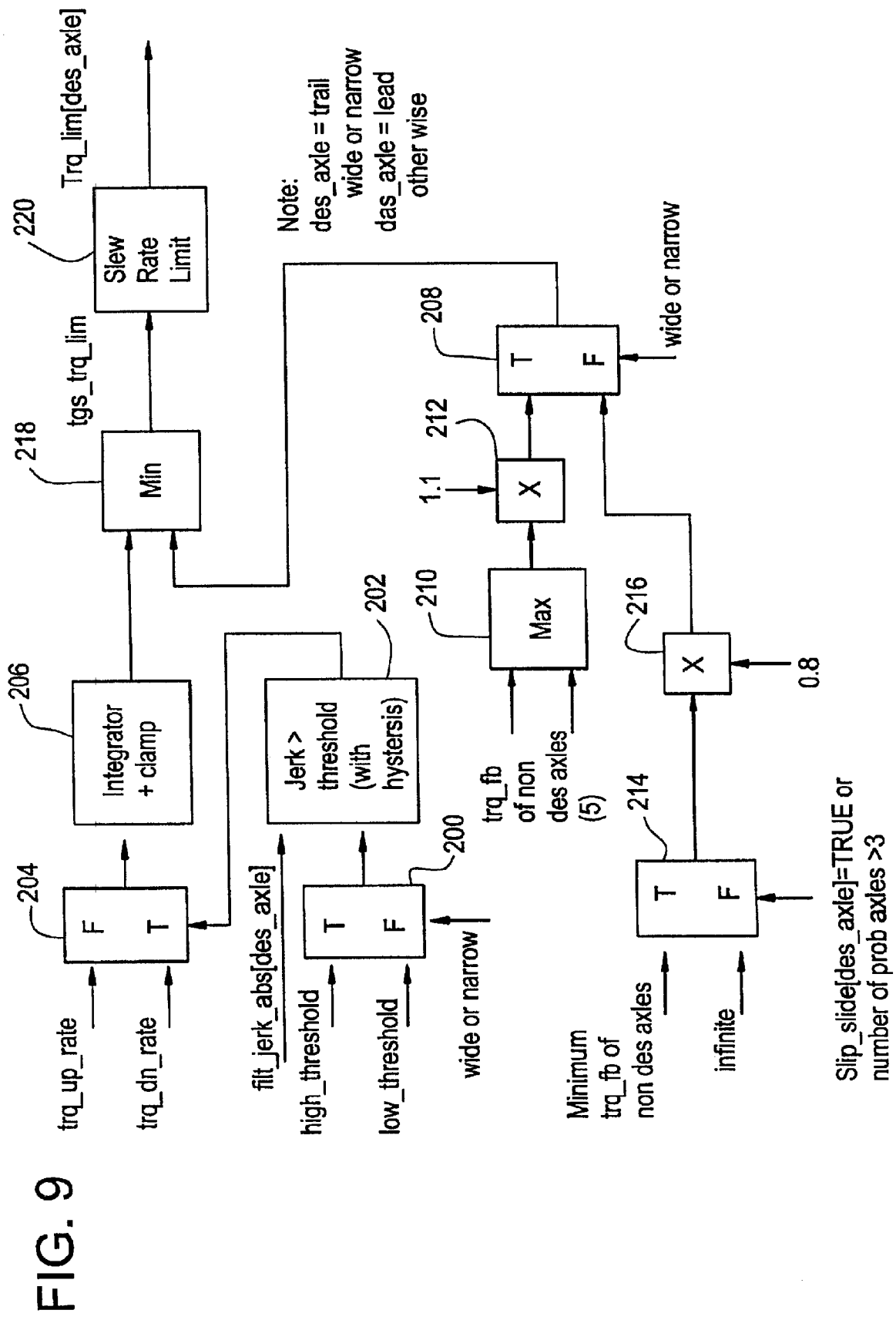
FIG. 9 is a block diagram of a system implemented by the controller of FIG. 1 for limiting torque to a designated axle.

Another aspect of the invention is the control of torque on the designated axle. As described above, one axle is selected as the designated axle and torque and jerk limits are applied to this axle to minimize actual creep. FIG. 9 is a block diagram of system for controlling torque to the designated axle. Controller 24 may implement the system shown in FIG. 9 by executing software for implementing the devices shown in FIG. 9. A jerk threshold is selected by selector 200 depending on whether the manager state machine 130 is in wide state 3 or narrow state 4. If the manager state machine 130 is in wide state 3 or narrow state 4, the high threshold is selected and if not, the low threshold is selected. A comparator 202 compares the absolute value of jerk on the designated axle (shown as filt_jerk_abs_des_axle) to the appropriate threshold. If the jerk exceeds the threshold, a selector 204 ramps the torque down by providing a negative torque rate trq_dn_rate to an integrator and clamp 206. Alternatively, if the jerk is below the low jerk threshold, then torque is increased by applying a positive torque rate trq_up_rate to the integrator and clamp 206. The integrator and clamp 206 sums torque rates provided from selector 204 and limits the sum at predefined limits.

The output of the integrator and clamp 206 is further limited depending on the mode of the manager state machine 130. When the manager state machine 130 is in the wide or narrow modes, a selector 208 selects a torque limit equal to a factor (e.g., 1.1) times the maximum torque produced by the other non-designated axles. In an exemplary embodiment, the locomotive has 6 axles. The maximum torque produced by one of the five non-designated axles is determined by maximum selector 210 which is then multiplied by 1.1 at multiplier 212. Alternatively, if the manager state machine 130 is not in wide or narrow mode, the selector 208 obtains a different torque limit. A selector 214 selects the minimum torque produced by the non-designated axles if the designated axle is slipping or the number of axles experiencing problems exceeds a limit (e.g. 3). These conditions indicate that torque should be limited on the designated axle. If neither of these conditions is true, the selector 214 selects an infinite value. The output of selector 214 is multiplied by a factor (e.g., 0.8) at multiplier 216. The output of selector 208 is provided to minimum selector 218 which selects the minimum of the torque limit from integrator 206 and the output of selector 208. This minimum is used as the torque limit tgs_trq_lim and is applied to a slew rate limiter 220 which limits the rate of change of the torque limit.

As described above, the present invention can be embodied in the form of controller-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a controller, the controller becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a processor, the processor becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the essential scope thereof Therefore, it is intended that the invention not be limited to the particular embodiments disclosed for carrying out the invention, but that the invention will include all embodiments falling within the scope of the appended claims.

What is claimed is:

1. A method for determining a reference speed approximating a ground speed of a vehicle having a plurality of powered axles each having at least one wheel which is subject to creep relative to the ground as the vehicle is propelled, the method comprising:
   selecting a measured speed indicative of the vehicle speed from the axle of said plurality of axles having the lowest speed;
   determining the axle of said plurality of axles having a predetermined amount of creep and designating said axle as a speed axle;
   determining a derived speed for said speed axle;
   calculating a creep value for said speed axle;
   compensating said derived speed by subtracting a creep value from said derived speed to obtain a corrected speed indicative of the vehicle speed;
   determining operating dynamics for the vehicle; and
   generating the reference speed based on one of said measured speed or said corrected speed, in response to said operating dynamics.

2. The method of claim 1 wherein the creep value is determined based on a change in torque on the speed axle.

3. The method of claim 1 wherein the creep value is limited to a selected value.

4. The method of claim 1 wherein said generating the reference speed includes selecting one of said measured speed and said corrected speed to define an adjusted speed, said reference speed being determined based on the adjusted speed.

5. The method of claim 4 further comprising determining a raw reference speed by applying a lower limit and an upper limit to the adjusted speed to define a raw reference speed.

6. The method of claim 5 further comprising determining the reference speed by applying a further lower limit and a further upper limit to the raw reference speed to define the reference speed.

7. The method of claim 6 further comprising determining the reference speed by applying a lower slew limit and an upper slew limit to the raw reference speed to define the reference speed.

8. The method of claim 7 wherein the lower slew limit is determined in response to a measured acceleration minus an uncertainty value.

9. The method of claim 7 wherein the upper slew limit is determined in response to a measured acceleration plus an uncertainty value.

10. The method of claim 1 wherein said determining operating dynamics includes:
  obtaining a plurality of sampled speed values from said speed axle;
  determining a degree of uncertainty in said plurality of sampled speed values; and
  determining an operating mode of the vehicle in response to said degree of uncertainty.

11. The method of claim 10 wherein:
  said determining a degree of uncertainty includes determining a rate of change in acceleration between sampled speed values, said rate of change in acceleration being indicative of jerk on said speed axle;
  setting said operating mode to a wide mode if said jerk exceeds an upper limit.

12. The method of claim 11 further comprising:
  setting said operating mode to a narrow mode if said jerk is less than a lower limit.

13. The method of claim 10 further comprising:
  obtaining said derived speed signal based on extrapolation between said sampled speed values;
  determining a first correction based on a relationship between said measured speed signal and said derived speed signal; and
  setting said operating mode in response to said first correction.

14. The method of claim 13 further comprising:
  setting said operating mode to a wide mode if said first correction exceeds an upper limit.

15. The method of claim 13 further comprising:
  setting said operating mode to a narrow mode if said first correction is less than a lower limit.

16. The method of claim 10 further comprising:
  obtaining said derived speed signal based on extrapolation between said sampled speed values;
  determining a second correction based on a relationship between said extrapolation and one of said sampled speed values; and
  setting said operating mode in response to said second correction.

17. The method of claim 16 wherein:
  setting said operating mode to a wide mode if said second correction exceeds an upper limit.

18. The method of claim 16 further comprising:
  setting said operating mode to a narrow mode if said second correction is less than a lower limit.

19. The method of claim 1 wherein said calculating a creep value for said speed axle includes:
  determining a torque limit based on a percentage of operating torque;
  obtaining a pre-sample of speed and torque from said speed axle;
  ramping torque to the speed axle down to the torque limit;
  holding the torque at the torque limit for a time period;
  obtaining a sample of speed and torque from said speed axle;
  ramping the torque to the speed axle up to operating torque;
  obtaining a post-sample of speed and torque from said speed axle; and,
  determining an adhesion creep curve for the speed axle in response to pre-sample speed and torque, sampled speed and torque and post-sample speed and torque.

20. The method of claim 1 wherein said determining said derived speed includes:
  periodically reducing torque to said speed axle and sampling speed of said speed axle;
  adjusting the period between said sampling in response to one of creep, speed and tractive effort for said speed axle.

21. The method of claim 20 wherein:
  a time period between said sampling is reduced if a change in a number of axles in a slip condition exceeds a limit.

22. The method of claim 20 wherein:
  a time period between said sampling is reduced if a change in creep exceeds a limit.

23. The method of claim 20 wherein:
  a time period between said sampling is reduced if a change in tractive effort exceeds a limit.

24. The method of claim 1 wherein determining said derived speed includes:
  periodically reducing torque to said speed axle and obtaining a plurality of sampled speed values;
  extrapolating between said sampled speed values to obtain said derived speed; and,
  determining a reference speed based on one of said measured speed and said derived speed.

25. The method of claim 24 wherein:
  said determining a reference speed is based on said measured signal if said measured speed is less than said derived speed.

26. A vehicle control system for determining a reference speed approximating a ground speed of a vehicle having a plurality of powered axles each having at least one wheel which is subject to creep relative to the ground as the vehicle is propelled, the system comprising:
  a plurality of speed sensors, each speed sensor associated with one of the axles;
  a plurality of motors, each motor associated with one of the axles;
  a controller in communication with said speed sensors and said motor, said controller including a storage medium including instructions for causing said controller to implement a control process including:
    selecting a measured speed indicative of the vehicle speed from the axle of said plurality of axles having the lowest speed;
    determining the axle of said plurality of axles having a predetermined amount of creep and designating said axle as a speed axle;
    determining a derived speed for said speed axle;
    calculating a creep value for said speed axle;
    compensating said derived speed by subtracting a creep value from said derived speed to obtain a corrected speed indicative of the vehicle speed;
    determining operating dynamics for the vehicle; and
    generating the reference speed based on one of said measured speed or said corrected speed, in response to said operating dynamics.

27. The system of claim 26 wherein the creep value is determined based on a change in torque on the speed axle.

28. The system of claim 26 wherein the creep value is limited to a selected value.

29. The system of claim 26 wherein said generating the reference speed includes selecting one of said measured speed and said corrected speed to define an adjusted speed, said reference speed being determined based on the adjusted speed.

30. The system of claim 29 wherein said control process further includes determining a raw reference speed by applying a lower limit and an upper limit to the adjusted speed to define a raw reference speed.

31. The system of claim 30 wherein said control process further includes determining the reference speed by applying a further lower limit and a further upper limit to the raw reference speed to define the reference speed.

32. The system of claim 31 wherein said control process further includes determining the reference speed by applying a lower slew limit and an upper slew limit to the raw reference speed to define the reference speed.

33. The system of claim 32 wherein the lower slew limit is determined in response to a measured acceleration minus an uncertainty value.

34. The system of claim 32 wherein the upper slew limit is determined in response to a measured acceleration plus an uncertainty value.

35. The system of claim 26 wherein said determining operating dynamics includes:
   obtaining a plurality of sampled speed values from said speed axle;
   determining a degree of uncertainty in said plurality of sampled speed values; and
   determining an operating mode of the vehicle in response to said degree of uncertainty.

36. The system of claim 35 wherein:
   said determining a degree of uncertainty includes determining a rate of change in acceleration between sampled speed values, said rate of change in acceleration being indicative of jerk on said speed axle;
   wherein said control process further includes setting said operating mode to a wide mode if said jerk exceeds an upper limit.

37. The system of claim 36 wherein said control process further includes:
   setting said operating mode to a narrow mode if said jerk is less than a lower limit.

38. The system of claim 35 wherein said control process further includes:
   obtaining said derived speed signal based on extrapolation between said sampled speed values;
   determining a first correction based on a relationship between said measured speed signal and said derived speed signal; and
   setting said operating mode in response to said first correction.

39. The system of claim 38 wherein said control process further includes:
   setting said operating mode to a wide mode if said first correction exceeds an upper limit.

40. The system of claim 38 wherein said control process further includes:
   setting said operating mode to a narrow mode if said first correction is less than a lower limit.

41. The system of claim 35 wherein said control process further includes:
   obtaining said derived speed signal based on extrapolation between said sampled speed values;
   determining a second correction based on a relationship between said extrapolation and one of said sampled speed values; and
   setting said operating mode in response to said second correction.

42. The system of claim 41 wherein said control process further includes:
   setting said operating mode to a wide mode if said second correction exceeds an upper limit.

43. The system of claim 41 wherein said control process further includes:
   setting said operating mode to a narrow mode if said second correction is less than a lower limit.

44. The system of claim 26 wherein said calculating a creep value for said speed axle includes:
   determining a torque limit based on a percentage of operating torque;
   obtaining a pre-sample of speed and torque from said speed axle;
   ramping torque to the speed axle down to the torque limit;
   holding the torque at the torque limit for a time period;
   obtaining a sample of speed and torque from said speed axle;
   ramping the torque to the speed axle up to operating torque;
   obtaining a post-sample of speed and torque from said speed axle; and,
   determining an adhesion creep curve for the speed axle in response to pre-sample speed and torque, sampled speed and torque and post-sample speed and torque.

45. The system of claim 26 wherein said determining said derived speed includes:
   periodically reducing torque to said speed axle and sampling speed of said speed axle;
   adjusting the period between said sampling in response to one of creep, speed and tractive effort for said speed axle.

46. The system of claim 45 wherein:
   a time period between said sampling is reduced if a change in a number of axles in a slip condition exceeds a limit.

47. The system of claim 45 wherein:
   a time period between said sampling is reduced if a change in creep exceeds a limit.

48. The system of claim 45 wherein:
   a time period between said sampling is reduced if a change in tractive effort exceeds a limit.

49. The system of claim 26 wherein determining said derived speed includes:
   periodically reducing torque to said speed axle and obtaining a plurality of sampled speed values;
   extrapolating between said sampled speed values to obtain said derived speed; and,
   determining a reference speed based on one of said measured speed and said derived speed.

50. The system of claim 49 wherein:
   said determining a reference speed is based on said measured signal if said measured speed is less than said derived speed.

* * * * *

UNITED STATES PATENT AND TRADEMARK OFFICE
CERTIFICATE OF CORRECTION

PATENT NO.         : 6,758,087 B2
APPLICATION NO. : 09/842554
DATED              : July 6, 2004
INVENTOR(S)        : Edgar T. Balch et al.

It is certified that error appears in the above-identified patent and that said Letters Patent is hereby corrected as shown below:

Column 3,
Line 41, after "sas__" delete "qtr" and insert therefor --trq--.

Signed and Sealed this

Fourth Day of July, 2006

JON W. DUDAS
*Director of the United States Patent and Trademark Office*